United States Patent
Devisetty et al.

(10) Patent No.: US 10,457,611 B2
(45) Date of Patent: Oct. 29, 2019

(54) ARBUSCULAR MYCORRHIZAL SEED AND IN-FURROW COMPOSITIONS CONTAINING POLYETHYLENE GLYCOL AND METHODS OF THEIR USE

(71) Applicant: Valent BioSciences LLC, Libertyville, IL (US)

(72) Inventors: Bala N. Devisetty, Buffalo Grove, IL (US); Alok Adholeya, St Louis, MO (US)

(73) Assignee: VALENT BIOSCIENCES LLC, Libertyville, IL (US)

( * ) Notice: Subject to any disclaimer, the term of this patent is extended or adjusted under 35 U.S.C. 154(b) by 230 days.

(21) Appl. No.: 15/656,303

(22) Filed: Jul. 21, 2017

(65) Prior Publication Data
US 2018/0022659 A1 Jan. 25, 2018

Related U.S. Application Data

(60) Provisional application No. 62/365,682, filed on Jul. 22, 2016, provisional application No. 62/365,698, filed on Jul. 22, 2016.

(51) Int. Cl.
| | | |
|---|---|---|
| *C05F 11/08* | (2006.01) | |
| *C05G 3/00* | (2006.01) | |
| *A01C 1/06* | (2006.01) | |

(52) U.S. Cl.
CPC ............... *C05F 11/08* (2013.01); *A01C 1/06* (2013.01); *C05G 3/0064* (2013.01)

(58) Field of Classification Search
None
See application file for complete search history.

(56) References Cited

U.S. PATENT DOCUMENTS

| | | | |
|---|---|---|---|
| 2008/0264858 A1 | 10/2008 | Stamets | |
| 2010/0249193 A1 | 9/2010 | Andersch et al. | |
| 2013/0145805 A1* | 6/2013 | Olson | C05D 9/00 71/6 |
| 2014/0005047 A1 | 1/2014 | Hungenberg et al. | |
| 2014/0059157 A1 | 3/2014 | Jessop | |
| 2014/0069157 A1* | 3/2014 | Jessop | A01N 25/08 71/23 |
| 2014/0109636 A1* | 4/2014 | Jessop | A01N 25/00 71/7 |
| 2015/0203414 A1* | 7/2015 | Cook | C05D 9/00 71/7 |
| 2015/0291480 A1* | 10/2015 | Nakajima | C05F 11/00 71/23 |
| 2017/0156337 A1* | 6/2017 | Scannell | A01G 22/00 |

FOREIGN PATENT DOCUMENTS

WO 2010130689 A1 11/2010

OTHER PUBLICATIONS

International Search Report and Written Opinion for corresponding PCT Application No. PCT/US17/43210 dated Oct. 10, 2017.

* cited by examiner

*Primary Examiner* — Wayne A Langel
(74) *Attorney, Agent, or Firm* — Wood, Phillips, Katz, Clark & Mortimer

(57) ABSTRACT

The present invention is directed to Mycorrhizal seed and in-furrow compositions containing polyethylene glycol. The present invention is further directed to methods of improving plant growth by applying Mycorrhizal seed and in-furrow compositions containing polyethylene glycol to a plant, plant propagation material or an area where a plant will grow.

17 Claims, No Drawings

ARBUSCULAR MYCORRHIZAL SEED AND IN-FURROW COMPOSITIONS CONTAINING POLYETHYLENE GLYCOL AND METHODS OF THEIR USE

FIELD OF THE INVENTION

The present invention relates to Mycorrhizal seed and in-furrow compositions containing polyethylene glycol. The present invention further relates to methods of improving plant growth by applying Mycorrhizal seed and in-furrow compositions containing polyethylene glycol to a plant, plant propagation material or an area where a plant will grow.

BACKGROUND OF THE INVENTION

Huge amounts of water and fertilizer are utilized across agricultural and landscaping practices. These practices, although readily accepted and necessary, lead to an exacerbation of water quantity and quality issues across the world. For example, agriculture uses about 70% of the accessible freshwater. The water that is not used may be contaminated by dangerous chemicals found in fertilizers. Specifically, contamination of municipal water supplies by nitrates is dangerous to human health and increased phosphate content in rivers and streams leads to lower oxygen levels and possibly large-scale fish death.

Mycorrhizae are symbiotic associations between fungi (i.e. mycorrhizal fungi) and the roots of plants. Mycorrhizal fungi are associated with greater than 90% of all land plants including crops, grasses and trees. Mycorrhizal fungi provide many important benefits to plants including enhanced absorption of water and nutrients from the soil, increased drought resistance, increased pathogen resistance and protection, enhanced plant health and vigor, minimized effects of external stress, and enhanced seedling growth. In turn, the external application of Mycorrhizal fungi to plants can lead to less irrigation and fertilization, which saves water and reduces the amount of chemicals, such as nitrates and phosphorus, and almost all the micronutrients. Mycorrhizal fungi are most effective when introduced to the soil prior to seed germination or at early stages of plant root proliferation.

Current Mycorrhizae formulations include those developed by Mycorrhizal Applications, which produces liquid suspensions and wettable powders as seed treatments and in-furrow formulations. However, these formulations only contain about 7,600 propagules ("ppg's") per gram for seed treatments, about 950 ppg's per gram for in-furrow formulations and about 280 ppg's per gram for wettable powders and have been known to clog spray nozzle screens as large as 50 mesh. Further, current Mycorrhizae formulations are not "application friendly" and lack physical stability and homogeneity.

Accordingly, there is a need to develop new Mycorrhizae formulations capable of delivering higher concentrations of Mycorrhizal fungi while maintaining prolonged and efficient viability and non-dormant propagules, as well as physical stability and homogeneity.

SUMMARY OF THE INVENTION

The present invention is directed to plant growth compositions containing Mycorrhizae and a polyethylene glycol.
The present invention is further directed to methods of improving plant growth by applying the compositions of the present invention to plants, plant propagation material including seeds and seedlings or an area where a plant will grow including plant root zones and furrows.

DETAILED DESCRIPTION OF THE INVENTION

As used herein, the terms "Mycorrhiza" or "Mycorrhizae" refers to an organic material containing a Mycorrhizal fungus and the plant roots to which the Mycorrhizal fungus is symbiotically associated. The symbiotic association of the Mycorrhizal fungus to the plant roots may be either intracellular (i.e. arbuscular Mycorrhiza) or extracellular (i.e. ectomycorrhiza). Other types of Mycorrhiza, such as ericoid, arbutoid, monotropoid and Orchid Mycorrhiza, are also encompassed within the term "Mycorrhiza" or "Mycorrhizae."

As used herein, the term "propagules" (ppg's) refers to any mycorrhizal material capable of forming symbiosis with plant roots, such as seeds, seedlings, growing agriculture or tree crops, clonal and micro propagated plants, and the like.

As used herein, the term "plant propagation material" refers to seeds and seedlings of all kinds (fruit, tubers, and grains), clonal and micro propagated plants, and the like.

As used herein, "improving" means that the plant has more of the specific quality than the plant would have had it if it had not been treated by methods of the present invention.

As used herein, all numerical values relating to amounts, weight percentages and the like are defined as "about" or "approximately" each particular value, plus or minus 10%. For example, the phrase "at least 5.0% by weight" is to be understood as "at least 4.5% to 5.5% by weight." Therefore, amounts within 10% of the claimed values are encompassed by the scope of the claims.

As used herein % w/w denotes weight by total weight of the composition. All concentrations listed herein are in % w/w unless otherwise described.

The articles "a," "an" and "the" are intended to include the plural as well as the singular, unless the context clearly indicates otherwise.

The terms "composition" and "formulation" are used interchangeably throughout the application.

In one embodiment, the present invention is directed to a plant growth composition comprising from about 0.2% to about 20% w/w Mycorrhizae technical powder concentrate containing from about 300,000 to 400,000 propagules per gram ("ppg/g") and from about 66% to about 97% w/w of a polyethylene glycol.

Polyethylene glycols are compounds containing a repeating subunit of the following molecular structure H—(O—CH$_2$—CH$_2$)$_n$—OH. Polyethylene glycols are identified based on their average molecular weight. For example, a polyethylene glycol with an average molecular weight of 400 daltons is named polyethylene glycol 400. In a preferred embodiment, the polyethylene glycol has an average molecular weight from about 200 to about 400 daltons, more preferably the polyethylene glycol is polyethylene glycol 200.

In a preferred embodiment, the compositions of the present invention are free of water.

In another preferred embodiment, the compositions of the present invention contain a surfactant. In a more preferred embodiment the surfactant is at a concentration from about 0.5% to about 4% w/w.

Surfactants suitable for use in the compositions of the present invention include, but are not limited to, non-ionic, anionic, cationic, amphoteric, and other polymeric surfactants or their mixtures. Preferably, the surfactant is non-ionic because it is easily soluble in the preferred diluent, helps in stabilizing suspension, easily miscible in water, and is not phytotoxic to crops. More preferably the surfactant is from about 0.5% to about 4% w/w Tween® 20 (polysorbate 20; Tween is a registered trademark of Croda Inc.), In another preferred embodiment, the compositions of the present invention contain a rheological additive. In a more preferred embodiment, the rheological additive is at a concentration of from about 1% to about 5% w/w.

Rheological additives suitable for use in the compositions of the present invention include, but are not limited to, organic derivatives of clays such as Bentone® 38 (Bentone is a registered trademark of Elementis Specialties, Inc.), Bentone® 34, Bentone® 27V, Bentone® 1000 and Garamite® 1958 (Garamite is a registered trademark of BYK Additives, Inc). Bentone® 27V and Bentone® 38 are each an organically modified derivative of a hectorite clay. Bentone® 27V is also known as benzenemethanaminium, N,N-dimethyl-N-octadecyl-, chloride, reaction products with hectorite and has the CAS no. 94891-33-5. Bentone® 38 is also known as quaternium 18 hectorite and has the CAS no. 120001-31-9. Bentone® 34 and 1000 are each an organic derivative of a bentonite clay. Bentone® 34 is also known as quaternium 18 bentonite and has the CAS no. 68953-58-2. Bentone® 1000 has the CAS no. 887329-06-8. Garamite® 1958 is also known as alkyl quaternary ammonium clay. In a preferred embodiment, the rheological additive is Garamite® 1958.

In another embodiment, the composition contains a polar additive. In a more preferred embodiment the polar additive is at a concentration from about 0.5% to about 5% w/w.

Polar additives suitable for use in the compositions of the present invention include, but are not limited to, Jeffsol® AG 1555 (Jeffsol is a registered trademark of Huntsman Corporation.) Jeffsol® AG 1555 is a propylene carbonate also known as 1,2-propanediol cyclic carbonate and has the CAS no. 108-32-7.

In another embodiment, the compositions of the present invention may contain further or additional excipients such as wetting agents, preservatives, solubilizers, stabilizers, binders, film-formers, anti-foaming agents, dispersants, spreaders, stickers, pH regulators, humectants, dyes, ultraviolet light protectants, a vehicle or other components which facilitate production, storage stability, product handling application and biological efficacy.

In a preferred embodiment, the compositions of the present invention comprise more than about 3,000 ppg/g or more than about 20,000 propagules per gram.

In another preferred embodiment, the compositions of the present invention are capable of passing through a sieve that contains openings from about 105 to about 150 micrometers in diameter.

In a more preferred embodiment, the present invention is directed to a seed treatment composition comprising:
  from about 2% to about 20% w/w Mycorrhizae technical powder concentrate
  from about 75% to about 96% w/w of a polyethylene glycol with an average molecular weight from about 200 to about 400 daltons;
  from about 1% to about 5% w/w alkyl quaternary ammonium clay;
  from about 0.5% to about 5% w/w 1,2-propanediol cyclic carbonate; and
  from about 0% to about 4% w/w polysorbate 20.

In a yet more preferred embodiment, the present invention comprises polysorbate 20 at a concentration from about 0.5% to about 4% w/w.

In a most preferred embodiment, the present invention is directed to a seed treatment composition comprising:
  about 8.7% w/w Mycorrhizae technical powder concentrate
  about 85% w/w polyethylene glycol 200;
  about 3% w/w alkyl quaternary ammonium clay;
  about 2% w/w 1,2-propanediol cyclic carbonate; and
  about 3% w/w polysorbate 20.

In a more preferred embodiment, the present invention is directed to a seed treatment composition comprising:
  from about 0.2% to about 8% w/w Mycorrhizae technical powder concentrate
  from about 84% to about 97% w/w of a polyethylene glycol with an average molecular weight from about 100 to about 400 daltons;
  from about 1% to about 5% w/w alkyl quaternary ammonium clay;
  from about 0.5% to about 5% w/w 1,2-propanediol cyclic carbonate; and
  from about 0% to about 4% w/w polysorbate 20.

In a yet more preferred embodiment, the present invention comprises polysorbate 20 at a concentration from about 0.5% to about 4% w/w.

In a most preferred embodiment, the present invention is directed to a seed treatment composition comprising:
  about 1.5% w/w Mycorrhizae;
  about 91.0% w/w polyethylene glycol 200;
  about 2.5% w/w alkyl quaternary ammonium clay;
  about 2% w/w 1,2-propanediol cyclic carbonate; and
  about 3% w/w polysorbate 20.

Compositions of the present invention may be applied to any plant or plant propagation material thereof that may benefit from improved growth including agricultural crops, annual grasses, trees, shrubs, ornamental flowers and the like. Compositions of the present invention may further be applied to any area where a plant will grow including soil, a plant root zone and a furrow.

In another embodiment, the present invention is directed to methods of improving plant growth comprising applying a composition of the present invention to a plant or plant propagation material, preferably plant propagation material, more preferably seeds.

The compositions of the present invention may be applied at a rate of from about 5 to about 400 grams of Mycorrhizae per hectare, preferably from about 10 to about 300 grams per hectare and more preferably from about 25 to about 300 grams per hectare.

The compositions of the present invention may be combined with or applied concomitantly or sequentially with other seed treatment formulations containing both synthetic and biological or biorational pesticides, plant growth regulators, biostimulants and/or fertilizers.

These representative embodiments are in no way limiting and are described solely to illustrate some aspects of the invention.

Further, the following example is offered by way of illustration only and not by way of limitation.

EXAMPLES

Example 1. Formulation of a Mycorrhizae Seed Treatment

TABLE 1

|  | % w/w |
| --- | --- |
| Mycorrhizae technical powder concentrate | 8.7 |
| Polyethylene glycol 200 | 83.3 |
| Garamite ® 1958 | 3 |
| Jeffsol ® AG1555 | 2 |
| Tween ® 20 | 3 |

Initially, root fragments containing Mycorrhizae propagules are reduced to desirable size range by appropriate size reduction methods ensuring spore and propagule integrity. The processed Mycorrhizae powder concentrate is capable of passing through a standard sieve #100 (i.e. 149 micrometers) to a standard #140 (105 micrometers) sieve. A free-flow agent such as silicon dioxide available under brand names such as Zeofree® 80 (Zeofree® 80 is a registered trade mark of J.M. Huber Corporation] may be used in aid in propagule size reduction and further handling. Zeofree® 80 has the CAS #: 112926-00-8.

Initially the Garamite 1958 is dispersed in PEG 200 under high shear. The required amount of Tween 20 is added and mixed. Jeffsol® AG 1555 (Propylene carbonate) is added under high shear mixing to develop the gel and thus increase viscosity. The Mycorrhizae technical powder concentrate is then added under propeller mixing and mixing is continued until a homogenous suspension is obtained.

The resulting formulation will be storage stable and have good flow properties. The formulation thus prepared will maintain fungal spore viability.

Example 2. Formulation of a Mycorrhizae In-Furrow Composition

TABLE 2

|  | % w/w |
| --- | --- |
| Mycorrhizae | 1.5 |
| Polyethylene glycol 200 | 91.0 |
| Garamite ® 1958 | 2.5 |
| Jeffsol ® AG1555 | 2 |
| Tween ® 20 | 3 |

Initially, root fragments containing Mycorrhizae propagules are reduced to a desirable size range by appropriate size reduction methods ensuring spore and propagule integrity. The processed Mycorrhizae powder concentrate is capable of passing through a standard sieve #100 (i.e. 149 micrometers) to a standard #140 (105 micrometers) sieve. A free-flow agent such as silicon dioxide available under brand names such as Zeofree® 80 (Zeofree® 80 is a registered trade mark of J.M. Huber Corporation) may be used as an aid in propagule size reduction and further handling. Zeofree® 80 has the CAS #: 112926-00-8.

Garamite 1958 is first dispersed in PEG 200 under high shear. Tween 20 is added and mixed. Propylene carbonate (Jeffsol® AG 1555) is added and dispersed under high shear followed by addition of processed Mycorrhizae technical powder concentrate and mixing until a homogenous suspension is obtained. The resulting formulation will be storage stable and contain good flow properties. The formulations will also maintain fungal spore viability.

Example 3. Physical Properties of Mycorrhizae Compositions Containing Polyethylene Glycol

TABLE 3

|  | Example 1 Seed Treatment | Example 2 In-furrow | MycoApply Liquid Endo Seed & Furrow |
| --- | --- | --- | --- |
| Carrier | PEG 200 | PEG 200 | Water |
| Mycorrhizae Concentration (% w/w) | 8.73 | 1.46 | 2.5 |
| Mycorrhizae Concentration (ppg/g) | 22,836 | 3,808 | 7,612 |
| Viscosity (T = 0) (centipoise) | 1,070 (27.1° C.) | 332 (28.9° C.) | Not detected |
| Density (g/mL) | 1.05 | 1.12 | 1.015 |

As shown in Table 3, the compositions of the present invention have a greater viscosity profile and density than prior art Mycorrhizae compositions. Further, the compositions of the present invention contain three times the standard 7,612 ppg/g concentration of Mycorrhizae used for seed treatments and four times the standard 952 ppg/g concentration of Mycorrhizae used for in-furrow applications.

Example 4. Stability of Mycorrhizae Compositions Containing Polyethylene Glycol Prior art formulations and compositions of the present invention were formulated and packaged for suspendibility testing.

TABLE 4

| Time (Min) | MycoApply Liquid Endo Seed & Furrow Settling of solids to the bottom of container (%) | Example 1 Seed Treatment Settling of solids to the bottom of container (%) | Example 2 In-furrow Settling of solids to the bottom of container (%) |
| --- | --- | --- | --- |
| 1 | 8.4 | 0.0 | 0.0 |
| 2 | 11.6 | 0.0 | 0.0 |
| 3 | 14.0 | 0.0 | 0.0 |
| 4 | 16.0 | 0.0 | 0.0 |
| 5 | 17.6 | 0.0 | 0.0 |
| 6 | 19.6 | 0.0 | 0.0 |
| 7 | 20.8 | 0.0 | 0.0 |
| 8 | 22.8 | 0.0 | 0.0 |
| 9 | 25.4 | 0.0 | 0.0 |
| 10 | 26.0 | 0.0 | 0.0 |

As shown in Table 4, MycoApply Liquid Endo Seed & Furrow composition contains approximately 26% solids. All solids in this prior art aqueous formulation settled out to the bottom of the container within 10 minutes. In contrast, propagules in the polyethylene glycol compositions of the present invention remain stable for over 12 months demonstrating excellent stability.

Example 5. Bio-Efficacy of Mycorrhizae Compositions Containing Polyethylene Glycol Prior art formulations and compositions of the present invention were diluted to standard tank-mix Mycorrhizae application concentrations in water for either seed treatment or in-furrow application and applied to corn seeds or in-furrow in the green house. Mycorrhizae colonization was determined at harvest and is presented in Table 5 as a percent root length colonization by Arbuscular mycorrhizae in corn.

TABLE 5

| Formulation | Unformulated Mycorrhizae Concentrate | MycoApply EndoMaxx | Example 1 Seed Treatment | Example 2 In-furrow |
|---|---|---|---|---|
| Concentration (ppg/g) | 313,845 | 22,500 | 22,836 | 3,808 |
| % Arbuscular mycorrhizal Colonization | 8.95% | 10.94% | 10.47% | 10.43% |

As shown in Table 5, seeds treated with the formulation of Example 1 resulted in 10.43% of corn at harvest being colonized with Mycorrhizae, and 10.43% of corn grown in-furrows treated with the composition of Example 2 were colonized with Mycorrhizae. These result is comparable to that of commercial MycoApply EndoMaxx (10.94%) and was higher than unformulated Mycorrhizae concentrate (8.95%). Further, compositions of the present invention showed similar or better uptake of nutrients including nitrogen, phosphorous, potassium, zinc, iron, boron and molybdenum in plant shoots as compared to MycoApply EndoMaxx.

Example 6. Spore Viability of Mycorrhizae Compositions Containing Polyethylene Glycol Unformulated Mycorrhizae compositions and compositions of the present invention were stored at ambient temperature, 5° C., 25° C. and 30° C. for 12 months. Mycorrhizae spore viability was measured as a percent of total spores and is presented below in Tables 6 and 7.

TABLE 6

| Formulation | 0 Months | 12 Months |
|---|---|---|
| Unformulated Mycorrhizae Concentrate | 46% | 38% |
| Example 1 Seed Treatment | 68% | 73% |
| Example 2 In-furrow | 61% | 81% |

TABLE 7

| | 3 months | | | 12 months | | |
|---|---|---|---|---|---|---|
| Formulation | 5° C. | 25° C. | 30° C. | 5° C. | 25° C. | 30° C. |
| Example 1 Seed Treatment | 81% | 66% | 75% | 24% | 33% | 41% |

As seen in Tables 6 and 7 polyethylene glycol compositions of the present invention maintained spore viability over 1 year under variable ambient storage conditions and at constant storage temperatures of 5° C., 25° C., and 30° C.

What is claimed is:

1. A plant growth composition comprising from about 0.2% to about 20% w/w Mycorrhizae technical powder concentrate from about 66% to about 97% w/w of a polyethylene glycol, and from about 1% to about 5% w/w of an alkyl quaternary ammonium clay wherein % w/w denotes percent weight by total weight of the composition.

2. The composition of claim 1, wherein the composition is free of water.

3. The composition of claim 1, wherein the polyethylene glycol has an average molecular weight from about 200 to about 400 daltons.

4. The composition of claim 3, wherein the polyethylene glycol has an average molecular weight of 200 daltons.

5. The composition of claim 1, further comprising from about 0.5% to about 5% w/w of a surfactant.

6. The composition of claim 5, wherein the surfactant is a non-ionic surfactant.

7. The composition of claim 6, wherein the non-ionic surfactant comprises polysorbate 20.

8. The composition of claim 1, wherein the composition comprises more than about 3,000 propagules per gram.

9. The composition of claim 1, wherein the composition passes through a sieve comprising holes from about 105 to about 150 microns in diameter.

10. A method of improving plant growth comprising applying a composition of claim 1 to a plant, plant propagation material or an area where a plant will grow.

11. The method of claim 10, wherein the composition is applied to seeds.

12. The method of claim 10, wherein the composition is applied to an area where a plant will grow and wherein the area will a plant will grow is soil in the form of a furrow.

13. A plant growth composition comprising from about 0.2% to about 20% w/w Mycorrhizae technical powder concentrate from about 66% to about 97% w/w of a polyethylene glycol, and from about 0.5% to about 5% w/w of 1,2-propanediol cyclic carbonate wherein % w/w denotes percent weight by total weight of the composition.

14. A seed treatment composition comprising:
from about 2% to about 11% w/w Mycorrhizae technical powder concentrate
from about 75% to about 96% w/w of a polyethylene glycol with an average molecular weight from about 200 to about 400 daltons;
from about 1% to about 3% w/w alkyl quaternary ammonium clay;
from about 0.5% to about 5% w/w 1,2-propanediol cyclic carbonate; and
from about 0% to about 4% w/w polysorbate 20,
wherein % w/w denotes percent weight by total weight of the composition.

15. The seed treatment composition of claim 14 comprising:
about 7.4% w/w Mycorrhizae technical powder concentrate
about 85% w/w polyethylene glycol 200;
about 3% w/w alkyl quaternary ammonium clay;
about 2% w/w 1,2-propanediol cyclic carbonate; and
about 3% w/w polysorbate 20,
wherein % w/w denotes percent weight by total weight of the composition.

16. An in-furrow composition comprising:
from about 0.2% to about 8% w/w Mycorrhizae technical powder concentrate
from about 74% to about 97% w/w of a polyethylene glycol with an average molecular weight from about 100 to about 400 daltons;
from about 1% to about 3% w/w alkyl quaternary ammonium clay;
from about 0.5% to about 5% w/w 1,2-propanediol cyclic carbonate; and
from about 0.5% to about 4% w/w polysorbate 20, wherein % w/w denotes percent weight by total weight of the composition.

17. The in-furrow composition of claim 16 comprising:
about 1.5% w/w Mycorrhizae;
about 91% w/w polyethylene glycol 200;
about 2.5% w/w alkyl quaternary ammonium clay;
about 2% w/w 1,2-propanediol cyclic carbonate; and
about 3% w/w polysorbate 20,
wherein % w/w denotes percent weight by total weight of the composition.

* * * * *